United States Patent [19]

Tanaka et al.

[11] Patent Number: 4,669,749
[45] Date of Patent: Jun. 2, 1987

[54] VEHICLE SUSPENSION APPARATUS

[75] Inventors: Tadao Tanaka; Mitsuhiko Harara, both of Okazaki; Yasutaka Taniguchi; Masanaga Suzumura, both of Nagoya; Minoru Tatemoto, Okazaki; Naotake Kumagai, Aichi, all of Japan

[73] Assignee: Mitsubishi Jidosha Kogyo Kabushiki Kaisha, Tokyo, Japan

[21] Appl. No.: 799,430

[22] Filed: Nov. 19, 1985

[30] Foreign Application Priority Data

Nov. 30, 1984 [JP] Japan ............................ 59-182007[U]
Nov. 1, 1985 [JP] Japan ................................ 60-245489

[51] Int. Cl.⁴ ............................................. B60G 17/06
[52] U.S. Cl. .................................................... 280/707
[58] Field of Search ............... 280/707, 708, 709, 711, 280/714, 6 R, 6 H, DIG. 1; 188/299

[56] References Cited

U.S. PATENT DOCUMENTS

| | | | |
|---|---|---|---|
| 2,882,069 | 4/1959 | Faiver | 280/DIG. 1 |
| 2,950,124 | 8/1960 | Pribonic | 280/707 |
| 3,608,925 | 9/1971 | Murphy | 280/707 |
| 3,770,292 | 11/1973 | Palazzetti | 280/708 |
| 4,564,214 | 1/1986 | Tokunaga et al. | 280/708 |
| 4,575,116 | 3/1986 | Miyata | 280/707 |

FOREIGN PATENT DOCUMENTS 53-26021  3/1978  Japan .

Primary Examiner—John J. Love
Assistant Examiner—Karin L. Ferriter
Attorney, Agent, or Firm—Hedman, Gibson Costigan & Hoare

[57] ABSTRACT

In a vehicle suspension apparatus comprising communication control means for producing a disabling control signal for disabling the communicating solenoid valves when conditions are satisfied that the velocity detected by the velocity sensor exceeds a preset velocity and the steering angle detected by the steering sensor exceeds a preset steering angle and for producing an enabling control signal when the conditions are not satisfied, and roll control means for producing a control command signal for opening desired ones of the supply and exhaust control valves for a preset control time in order to supply a preset amount of fluid to contracted fluid spring chambers along a roll direction and for exhausting a preset amount of fluid from stretched fluid spring chambers when the conditions are satisfied, the preset velocity as one of the conditions determined by the communication control means is set to have a first value when the communicating solenoid valves are enabled and to have a second value larger than the first value when the communicating solenoid valves are disabled. With this apparatus, passengers experience uniform centrifugal force sensations when roll control is started and cancelled. Discomfort experienced by passengers during and after roll control is reduced to a minimum.

11 Claims, 16 Drawing Figures

VEHICLE SUSPENSION APPARATUS

BACKGROUND OF THE INVENTION

The present invention relates to a vehicle suspension apparatus which can reduce rolling of a vehicle making a turn.

In order to reduce rolling of a vehicle body making a turn, the present applicant had previously proposed a vehicle suspension apparatus comprising fluid spring means inserted between respective wheels of a vehicle and a vehicle body; fluid supply means for supplying a fluid to the fluid spring means through supply control valves, respectively; fluid exhaust means for exhausting the fluid from the fluid spring means through exhaust control valves, respectively; communicating means for enabling and disabling communication between right and left fluid spring chambers of the vehicle; velocity detecting means for detecting a velocity of the vehicle; steering angle detecting means for detecting a steering angle; communication control means for disabling said communicating means when conditions are satisfied that the velocity detected by the velocity detecting means exceeds a preset velocity and the steering angle detected by the steering angle detecting means exceeds a preset steering angle and for enabling the communicating means when the conditions are not satisfied; and roll control means for supplying a preset amount of fluid to fluid spring chambers on the contracted side with respect to the roll direction and for exhausting a preset amount of fluid from fluid spring chambers on the stretched side when the conditions are satisfied.

In this apparatus, during a vehicle drive pattern wherein the vehicle velocity is increased from zero and returned to zero again while the steering angle is set above the preset steering angle and when the velocity detecting means detects that the velocity has exceeded the preset velocity, the communicating means is disabled by the communication control means and roll control is started by the roll control means. When the velocity becomes lower than the preset velocity, the communication control means enables the communicating means.

In such a drive pattern, due to the presence of suspension units mounted between the vehicle body and wheels, passengers experience centrifugal force sensations slightly later than the actual increase/decrease in velocity.

In this drive pattern, passengers feel different centrifugal force sensations when the vehicle velocity is increased or decreased. Note that when the velocity is increased, the communication control means disables the communicating means and the roll control means starts roll control, and when the velocity is decreased, the communication control means enables the communicating means. Because of this, riding comfort of passengers in the vehicle is impaired, leading to poor control results.

SUMMARY OF THE INVENTION

It is an object of the present invention to provide a vehicle suspension apparatus which is free from the above problems.

According to the present invention, there is provided a vehicle suspension apparatus comprising: fluid spring means interposed between wheels of a vehicle and a vehicle body; fluid supply means for supplying a fluid to the fluid spring means through supply control valves, respectively; fluid exhaust means for exhausting the fluid from the fluid spring means through exhaust control valves, respectively; communicating means for enabling and disabling communication between right and left fluid spring chambers of the vehicle; velocity detecting means for detecting a velocity of the vehicle; steering angle detecting means for detecting a steering angle; communication control means for producing a disabling control signal for disabling the communicating means when conditions are satisfied that the velocity detected by the velocity detecting means exceeds a preset velocity and the steering angle detected by the steering angle detecting means exceeds a preset steering angle and for producing an enabling control signal for enabling the communicating means when the above-mentioned conditions are not satisfied; and roll control means for producing a control command signal for opening desired supply and exhaust control valves for a preset period of time so as to supply a preset amount of fluid to fluid spring chambers on the contracted side with respect to the rolling direction and to exhaust a preset amount of fluid from fluid spring chambers on the stretched side, wherein the preset velocity as a condition determined by the communication control means is set to have a first value when the communicating means is enabled and to have a second value larger than the first value when the communicating means is disabled.

DETAILED DESCRIPTION OF THE PREFERRED EMBODIMENTS

Figure 1:
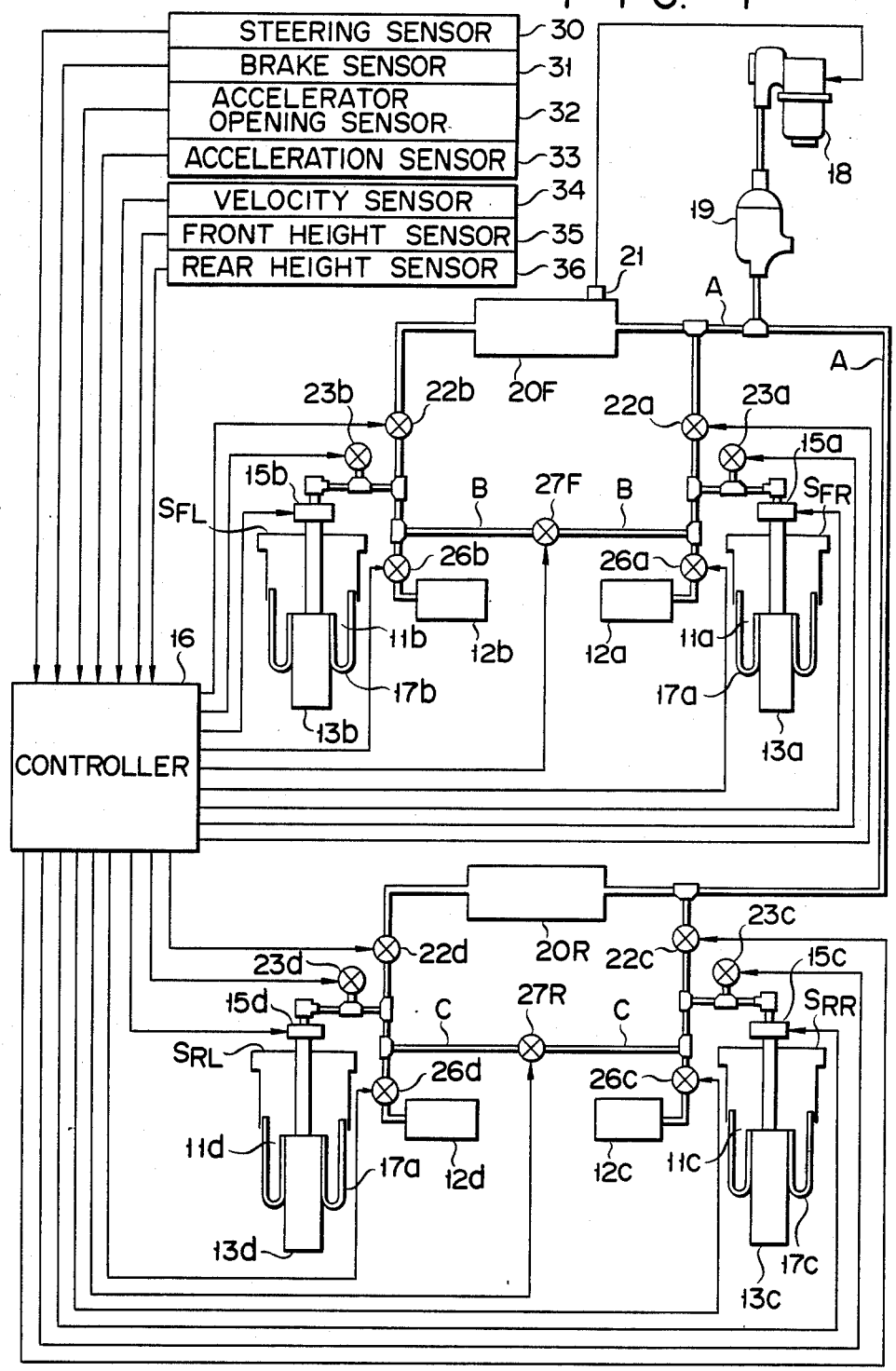
FIG. 1 is a diagram showing the overall configuration of a first embodiment of the present invention.

According to the present invention, an electronically controlled suspension apparatus will be described with reference to the accompanying drawings. Referring to FIG. 1, reference symbol $S_{FR}$ denotes a right front wheel suspension unit; $S_{FL}$, a left front wheel suspension unit; $S_{RR}$, a right rear wheel suspension unit; and $S_{RL}$, a left rear wheel suspension unit. Suspension units $S_{FR}$, $S_{FL}$, $S_{RR}$ and $S_{RL}$ respectively comprise main air spring chambers $11a$ to $11d$, sub air spring chambers $12a$ to $12d$, shock absorbers $13a$ to $13d$, and coil springs (not shown) serving as auxiliary springs. Reference numerals $15a$ to $15d$ denote switches for increasing or decreasing the damping forces of shock absorbers $13a$ to $13d$, respectively. Switches $15a$ to $15d$ are controlled by controller 16 having a microcomputer. Reference numerals 17a to 17d denote bellows.

Reference numeral 18 denotes a compressor for compressing atmospheric air supplied from an air cleaner (not shown) and supplying compressed air to drier 19. Drier 19 dries compressed air by using silica gel or the the like. The dried compressed air from drier 19 is stored in front wheel reserve tank 20F and rear wheel reserve tank 20R through pipe A. Reference numeral 21 denotes a pressure sensor arranged in reserve tank 20F. When an internal pressure in reserve tank 20F is decreased below a predetermined value, pressure sensor 21 generates a signal. Compressor 18 is activated in response to this signal. When the internal pressure of reserve tank 20F exceeds the predetermined value, compressor 18 is stopped in response to the signal from pressure sensor 21.

Reserve tank 20F is coupled to main air spring chamber 11a through inlet solenoid valve 22a. Similarly, reserve tank 20F is coupled to main air spring chamber 11b through inlet solenoid valve 22b. Furthermore, reserve tank 20R is connected to main air spring chamber 11c through inlet solenoid valve 22c. Similarly, reserve tank 20R is coupled to main air spring chamber 11d through inlet solenoid valve 22d. It should be noted that solenoid valves 22a to 22d comprise normally closed valves.

The compressed air is exhausted to the atmosphere from main air spring chambers 11a to 11d through corresponding exhaust solenoid valves 23a to 23d and then through an exhaust pipe (not shown). It should be noted that solenoid valves 23a to 23d comprise normally closed valves.

Main air spring chamber 11a is coupled to sub air spring chamber 12a through spring constant adjusting solenoid valve 26a. Similarly, main air spring chambers 11b, 11c and 11d are coupled to sub air spring chambers 12b, 12c and 12d through spring constant adjusting solenoid valves 26b, 26c and 26d.

Main air spring chambers 11a and 11b are coupled to each other through communicating pipe B and communicating solenoid valve 27F. Similarly, air spring chambers 11c and 11d are coupled to each other through communicating pipe C and communicating solenoid valve 27R. It should be noted that solenoid valves 27F and 27R comprise normally open valves.

Solenoid valves 22a to 22d, 23a to 23d, 26a to 26d, and 27F and 27R are controlled in response to control signals from controller 16.

Reference numeral 30 denotes a steering sensor for detecting a steering wheel angle; 31, a brake sensor for detecting the ON/OFF state of the brake unit; 32, an accelerator opening sensor for detecting a throttle valve opening; 33, an acceleration sensor for detecting acceleration along the horizontal and vertical directions; 34, a velocity sensor for detecting a vehicle velocity; 35, a front height sensor for detecting a height at the front portion (front wheel portion) of the vehicle; and 36, a rear height sensor for detecting a height at the rear portion (rear wheel portion) of the vehicle. Signals from sensors 30 to 36 are supplied to controller 16.

The control sequence of controller 16 in this embodiment will be described with reference to the flow chart in FIG. 2.

Figure 2:
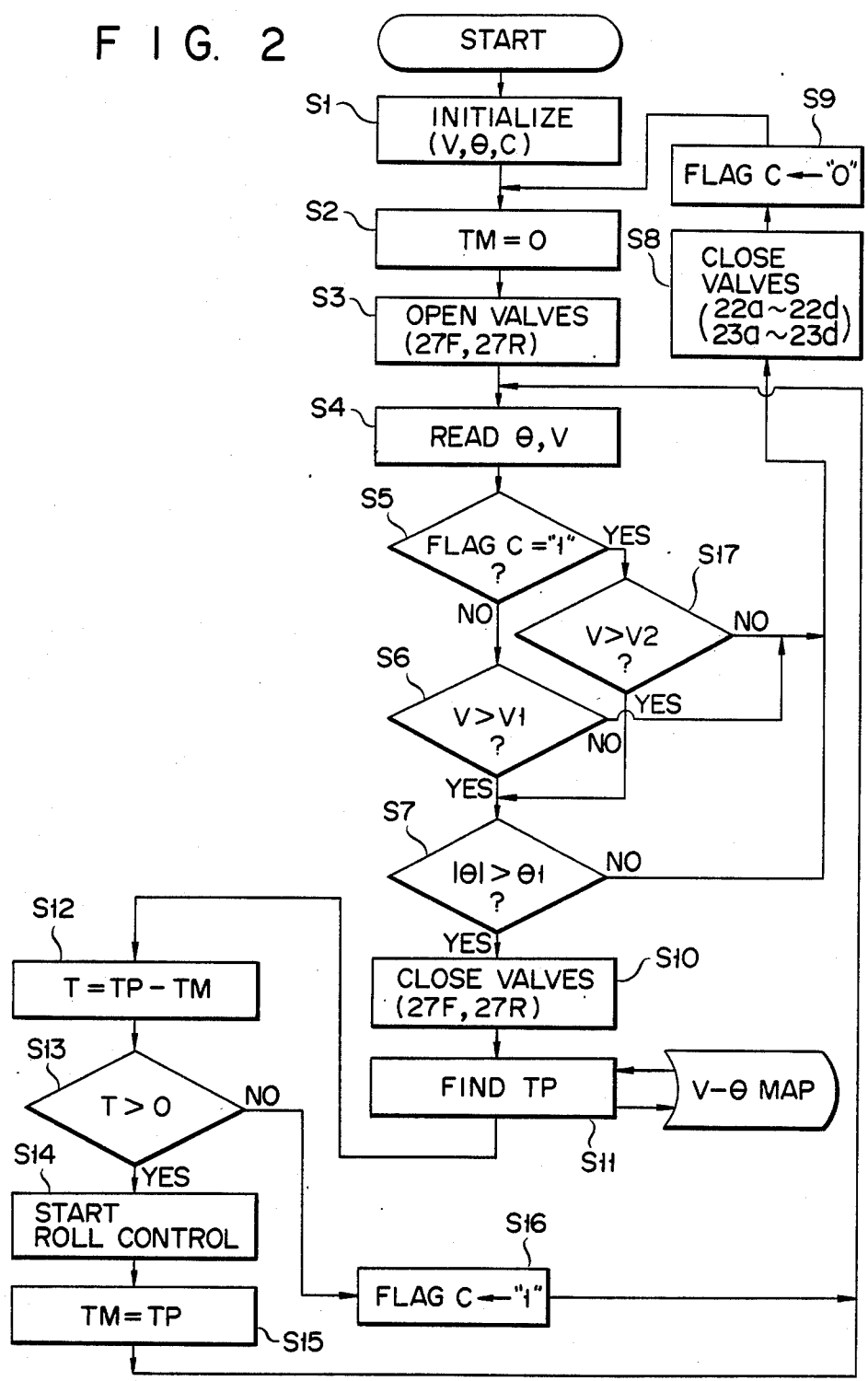
FIG. 2 is a flow chart showing the operation of controller 16 in the first embodiment.

When the ignition key (not shown) turns the vehicle motor on, the flow chart shown in FIG. 2 starts. In step S1, a predetermined memory region in controller 16 storing steering angle $\theta$, velocity V, and control hold flag C (to be described later) is cleared to 0. In step S2, map memory TM (to be described later) is reset (TM=0).

In step S3, valves 27F and 27R are opened by controller 16. If valves 27F and 27R have been open, controller 16 confirms that they are open. In step S4, steering angle $\theta$ detected by sensor 30 and velocity V detected by sensor 34 are stored in the predetermined memory area of controller 16.

In step S5, it is checked if control hold flag C is set to "1". Control hold flag C is set in step S16 (to be described later) when roll control is started. If roll control has not yet started, NO is obtained in step S5, and the flow advances to step S6.

In step S6, it is checked if velocity V stored in step S4 is larger than preset velocity V1. Velocity V1 is set such that substantially no rolling of the vehicle occurs even if the steering wheel (not shown) is quickly turned when velocity V is below preset velocity V1.

If YES in step S6, the flow advances to step S7. In step S7, it is checked if the absolute value $|\theta|$ of steering angle $\theta$ stored in step S4 is larger than preset steering angle $\theta 1$. Angle $\theta 1$ is set such that substantially no rolling occurs even if velocity V is high when the absolute value $|\theta|$ of steering angle $\theta$ is less than preset steering angle $\theta 1$.

If NO is obtained in step S7, the flow advances to step S8. In step S8, valves 22a to 22d and 23a to 23d are closed by a control signal from controller 16. If valves 22a to 22d and 23a to 23d have been closed, controller 16 confirms that this is so. In step S9, control hold flag C is set to "0", and the flow returns to step S2.

However, if YES in step S7, roll control from step S10 is started. More specifically, in step S10, controller 16 generates a control signal so as to close valves 27F and 27R. In step S11, control time TP for which the solenoid valves are to be opened is calculated from steering angle $\theta$ and velocity V stored in step S4, referring to the velocity-steering angle map stored in controller 16 and shown in FIG. 4. Control time TP is determined by regions I to VII of the velocity-steering angle map shown in FIG. 4. Regions I to VII are defined by the transverse acceleration acting on the vehicle body, which is determined by velocity V and steering angle $\theta$. Control time TP is illustrated in parentheses. In region I, control time T is 0. After step S11, control time T(=TP−TM) is calculated in step S12. Note that TM is a control time previously commanded and stored in the map memory in controller 16.

When it is determined in step S13 that T>0, the flow advances to step S14. In step S14, controller 16 generates an open control signal for opening the desired valves selected from valves 22a to 22d and 23a to 23d for control time T, thereby performing vehicle roll control. Roll control will be described with reference to a case wherein the steering wheel is turned clockwise.

Figure 3A:
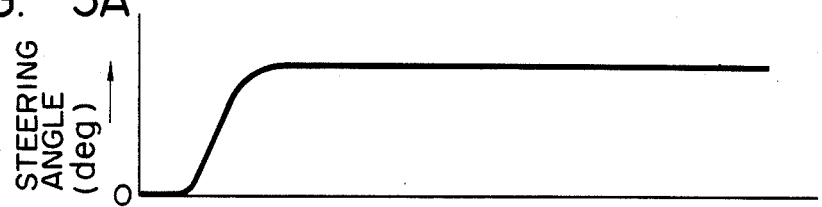
FIGS. 3A to 3E are timing charts for explaining the mode of operation in the first embodiment in a given travel pattern.
Figure 3B:
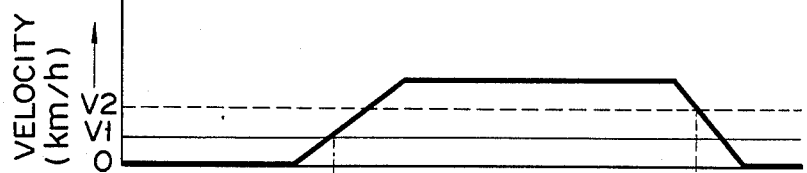
Figure 3C:
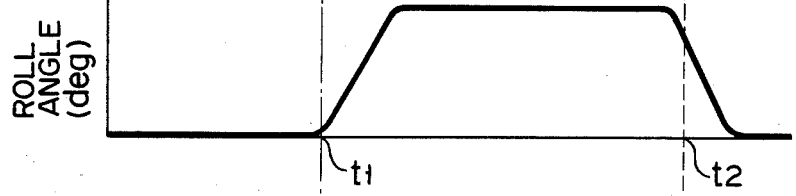
Figure 3D:
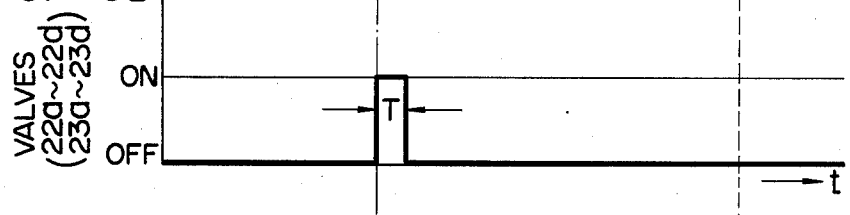
Figure 3E:
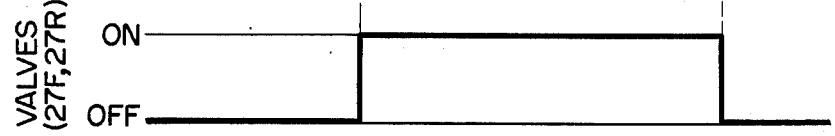

When the steering wheel is turned clockwise, valves 22b and 22d on the left wheel side are opened for control time T by a control signal from controller 16 as shown in FIG. 3D. Compressed air is supplied to main air spring chambers 11b and 11d in an amount corresponding to control time T. At the same time, valves 23a and 23c on the right wheel side are opened for control time T by a control signal from controller 16 as shown in FIG. 3D. Thus, compressed air is exhausted from main spring chambers 11a and 11c in an amount corresponding to control time T. Thus, the left side height of the vehicle is increased by air supply, and right side vehicle height is decreased by air exhaustion. With this roll control, vehicle roll to the left upon turning the steering wheel clockwise is prevented.

After step S14, the flow advances to step S15. In step S15, the map memory is updated i.e., TM is updated to TP. After step S15, the flow returns to step S4 in order to monitor the next change.

Figure 4:
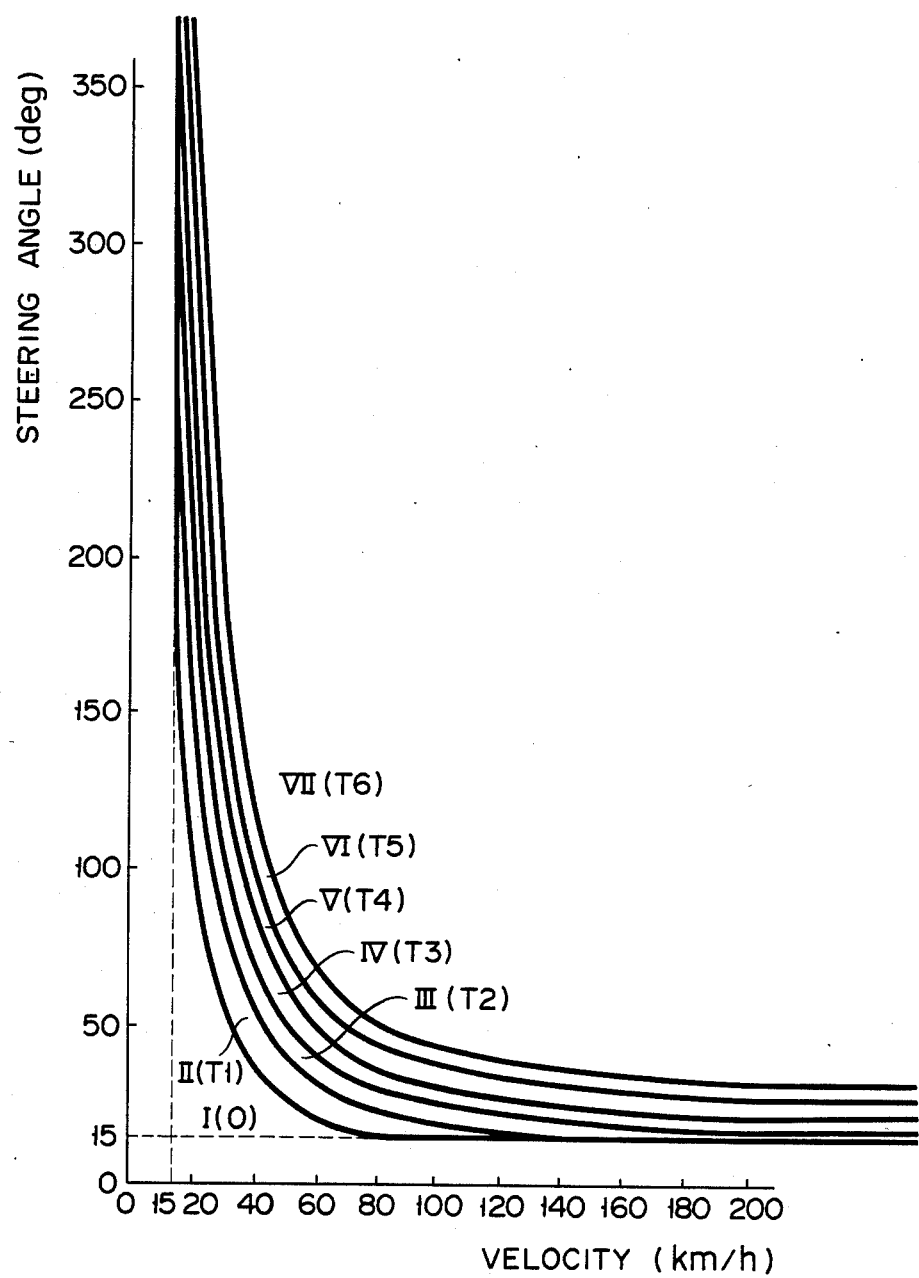
FIG. 4 is a graph showing the velocity-steering angle map in step S11 in the flow chart shown in FIG. 2.

Assume a case wherein the vehicle makes a turn at velocity V and steering angle $\theta$ in the same region in the velocity-steering angle map shown in FIG. 4, or in a region of the map wherein a control time is short. In this case, control time TP calculated in step S11 is equal to or smaller than time TM stored in the map memory. Therefore, it is determined in step S13 that T>0, and the flow advances to step S16. In step S16, control hold flag C in a predetermined memory area of controller 16 is set to "1", and the flow returns to step S4 so as to monitor the next change.

Now assume another case wherein the vehicle makes a turn at velocity V and steering angle $\theta$ into a region of the velocity-steering angle map of FIG. 4 in which a control time is long. In this case, control time TP calculated in step S11 is larger than time TM. Therefore, additional control time T(=TP−TM) is calculated in step S12, and control is performed for control time T.

After the second execution of step S4, YES is obtained in step S5 (i.e., it is determined that control hold flag C is set to "1"). The flow then advances to step S17. In step S17, it is checked if velocity V fetched in controller 16 in step S4 is larger than preset velocity V2. Note that preset velocity V2 is set to be larger than preset velocity V1. When YES is obtained in step S17, the flow advances to step S7. However, when NO is obtained in step S17, the flow advances to step S8.

When the vehicle travels straight after the steering wheel is returned to a neutral range, NO is obtained in step S7, and roll control is cancelled through steps S8, S9, S2, and S3. Thus, a normal travel state is restored.

Now assume a case wherein velocity V is decreased below preset velocity V2 while the vehicle is making a turn at a given steering angle exceeding preset steering angle $\theta1$. In this case, NO is obtained in step S17, and roll control is cancelled through steps S8, S9, S2, and S3. Thus, a normal travel state is restored as above.

As can be seen from the above, according to the first embodiment of the present invention, roll of the vehicle body during a turn is effectively prevented. In addition, conditions for opening the desired valves selected from valves 22a to 22d and 23a to 23d and for closing solenoid valves 27F and 27R are determined as follows. If control hold flag C is not set at "1", the desired valves selected from valves 22(a) to 22(d) and 23(a) to 23(d) are opened and valves 27F and 27R are closed when velocity V is less than preset velocity V1. However, if control hold flag C is set at "1", the desired valves selected from valves 22(a) to 22(d) and 23(a) to 23(d) are opened and valves 27F and 27R are closed when velocity V is less than preset velocity V2. Assume a travel pattern wherein the velocity is increased from 0 and is then returned to 0 while steering angle $\theta$ is larger than preset steering angle $\theta1$. In this case, as shown in FIGS. 3A to 3E, solenoid valves 27F and 27R are closed at time t1 at which velocity V becomes equal to V1. At the same time, desired inlet and exhaust solenoid valves are opened for a predetermined period of time. Valves 27F and 27R are opened at time t2 at which velocity V becomes less than to velocity V2. Because of this control, passengers experience substantially uniform centrifugal sensations when roll control is started and cancelled. Thus, discomfort experienced by passengers during or after roll control is reduced to a minimum.

Figure 5:
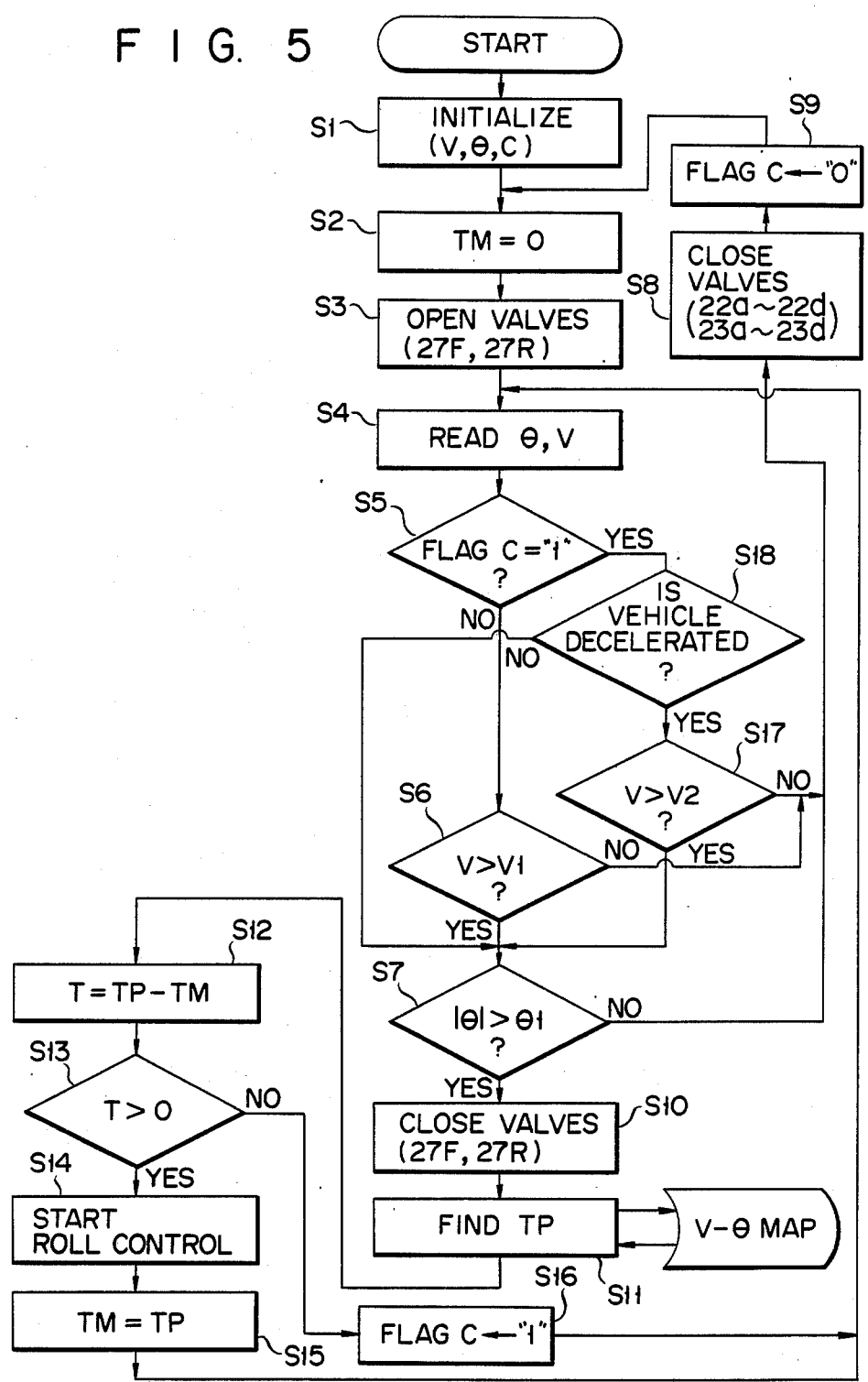
FIG. 5 is a flow chart showing the operation of controller 16 in a second embodiment of the present invention.

A second embodiment of the present invention will be described in detail with reference to FIG. 5.

The second embodiment has substantially the same arrangement as the first embodiment except that in the control sequence of controller 16, step S18 is executed when YES is obtained in step S5 of the first embodiment. Referring to the flow chart shown in FIG. 5, step S18 checks if the velocity fetched in step S4 is decreasing (if the vehicle is decelerated). If YES is obtained in step S18, the flow advances to step S17. However, if NO is obtained in step S18, the flow returns to step S7.

In the second embodiment, the following advantage can be obtained in addition to those obtained in the first embodiment.

Assume a travel pattern with reference to the first embodiment wherein the velocity is gradually increased while the steering wheel (not shown) is turned at a steering angle exceeding preset steering angle $\theta1$ checked in step S7. When it takes a long period of time for the velocity to go from V1 to V2, NO may be obtained in step S17 of the flow chart in FIG. 2, and steps S8, S9, S2 and S3 may be executed. In this case, even if a given pressure difference should be maintained between right and left air spring chambers, the right and left air spring chambers will be kept at the same pressure. In practice, however, preset velocity V1 is set at a very small value, and the difference between velocities V1 and V2 is also very small. Therefore, the probability of occurrence of the above-mentioned case is small, and if it does occur, the problem is a minor one.

The second embodiment of the present invention will be described with reference to the above-mentioned travel pattern. In the second embodiment, since step S18 is included in the flow chart, when control hold flag C is set at "1", the flow advances to step S17 only if the vehicle is decelerated. Thus, even if it takes a long period of time for the velocity to go from V2 to V1, a desired pressure difference can be maintained between the right and left air spring chambers until the vehicle decelerates. Thus, the problem occurring in the above-mentioned case can be prevented.

Figure 6:
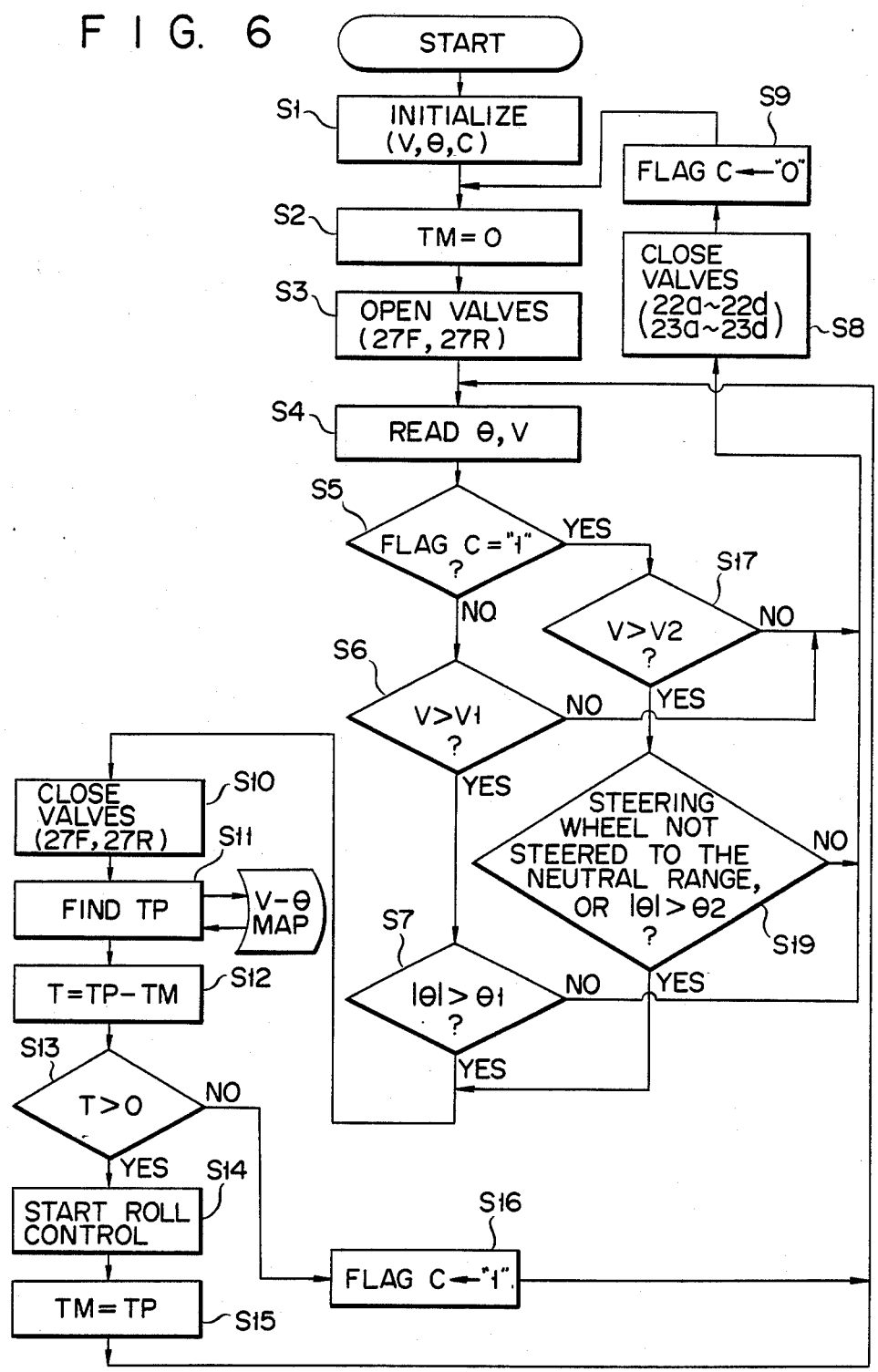
FIG. 6 is a flow chart showing the operation in a third embodiment of the present invention.
Figure 7A:
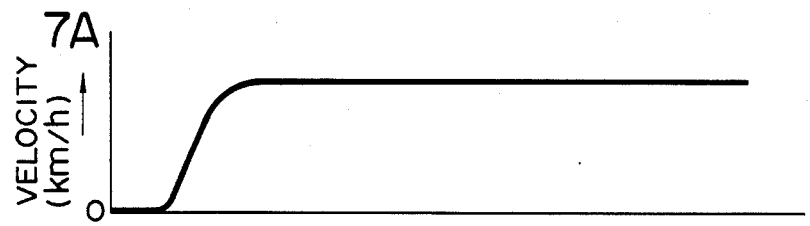
FIGS. 7A to 7E are timing charts for explaining the mode of operation of the third embodiment in a given travel pattern.
Figure 7B:
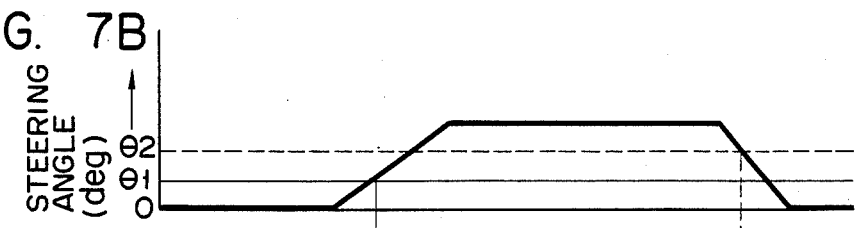
Figure 7C:
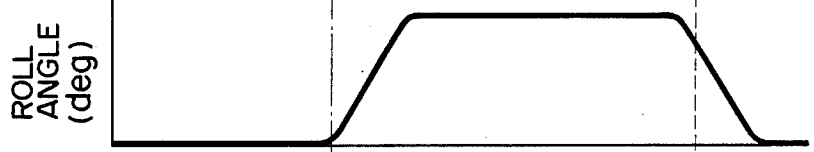
Figure 7D:
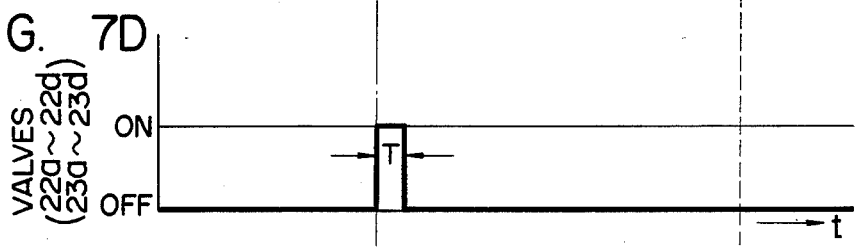
Figure 7E:
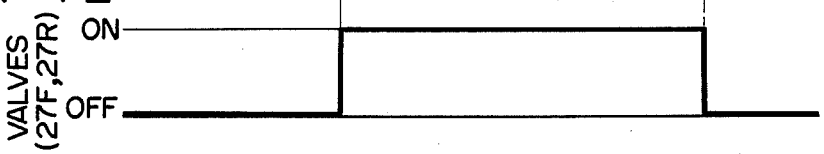

A third embodiment of the present invention will be described with reference to FIG. 6.

The third embodiment has substantially the same configuration as that of the first embodiment except that in the control sequence of controller 16, step S19 is executed when YES is obtained in step S17 of the first embodiment. Referring to the flow chart shown in FIG. 6, step S19 checks if the steering wheel is not steered to the neutral range or if the absolute value $|\theta|$ of steering angle $\theta$ is larger than preset steering angle $\theta2$, which is larger than preset steering angle $\theta1$. If YES is obtained in step S19, the flow advances to step S10. However, if NO is obtained in step S19, the flow advances to step S8.

In the third embodiment, the following advantage can be obtained in addition to those obtained in the first embodiment.

Assume a travel pattern wherein the vehicle makes a turn from straight travel and then returns to straight travel while the velocity is kept larger than velocity V2. In this case, due to the presence of suspension units interposed between respective wheels and vehicle body, passengers experience centrifugal sensations at a time later than the actual increase/decrease in steering angle of the steering wheel. Assuming this, in the first embodiment, passengers may experience slightly different centrifugal sensations when roll control is started and is cancelled. Note that roll control is started when the steering wheel is turned from the neutral range and the steering angle exceeds preset steering angle $\theta 1$. Note also that roll control is cancelled when the steering wheel is returned to the neutral range and the steering angle becomes less than preset steering angle $\theta 1$. Thus, although slight, passengers may feel discomfort.

The third embodiment will be considered with reference to the above-mentioned travel pattern. In the third embodiment, step S19 is included in the flow chart. As can be seen from the timing charts in FIGS. 7A to 7E, when the steering wheel is turned from the neutral range, if the steering angle exceeds preset steering angle $\theta 1$, controller 16 produces a control signal for closing valves 27F and 27R and opening desired inlet and exhaust solenoid valves for a preset period of time. Thereafter, when sensor 30 detects that the steering wheel is returned to the neutral range, controller 16 produces a control signal for opening valves 27F and 27R when the steering angle becomes less than preset steering angle $\theta 2$.

In the third embodiment with the above-mentioned travel pattern, passengers experience substantially the same centrifugal forces when roll control is started and cancelled. Thus, discomfort experienced by passengers during and after roll control can be prevented.

Figure 8:
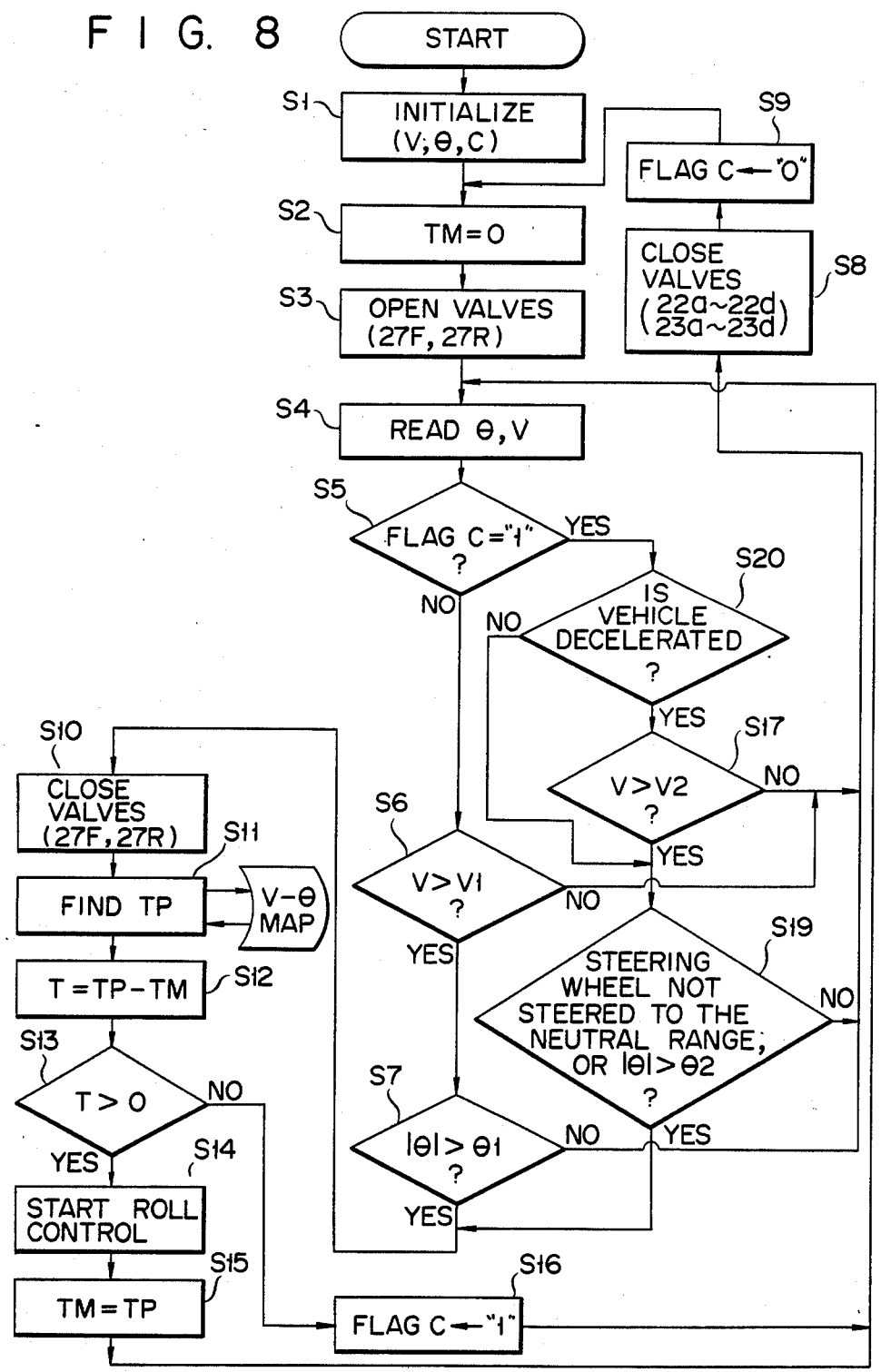
FIG. 8 is a flow chart showing the operation of controller 16 in a fourth embodiment of the present invention.

A fourth embodiment will be described with reference to FIG. 8.

The fourth embodiment has substantially the same configuration as that of the third embodiment except that in the control sequence of controller 16, step S20 is executed when YES is obtained in step S5 of the third embodiment. Referring to the flow chart shown in FIG. 8, step S20 checks if the velocity fetched in step S4 indicates that the vehicle is decelerated. If YES in step S20, the flow advances to step S17. However, if NO in step S20, the flow advances to step S19.

In the fourth embodiment, the following advantage can be obtained in addition to those obtained in the third embodiment.

In the fourth embodiment, since step S20 is included, the flow advances to step S17 only if control hold flag C is set at "1", i.e., if the vehicle is decelerated. Assume a travel pattern wherein the velocity is gradually increased while the steering wheel is turned at a steering angle exceeding preset steering angle $\theta 1$ determined in step S7. With this travel pattern, if it takes a long period of time for the velocity to go from V1 to V2, a desired pressure difference can be maintained between the right and left air spring chambers. Thus, the problem encountered in the previously mentioned situation can be prevented.

In each of the embodiments described above, controller 16 can generate additional control signals. Such additional control signals can include a control signal for increasing the spring constant supplied to spring constant switch solenoid valves 26a to 26d at the same time as that for closing valves 27F and 27R, and a control signal for increasing the attenuating force supplied to switches 15a to 15d. With the use of such additional control signals, roll prevention effect can be increased.

Although the above embodiments are described with reference to air spring suspension units, the present invention can be similarly applied to hydropneumatic suspension units.

Finally, the present invention is also applicable to a vehicle suspension apparatus wherein a separate reserve tank for storing air exhausted from air spring chambers is connected to the suction side of compressor 18, and the pneumatic system forms a closed loop.

What is claimed is:

1. A vehicle suspension apparatus comprising:
   fluid spring chambers arranged for respective wheels of a vehicle and interposed between the respective wheels and vehicle body members;
   fluid supply means for supplying a fluid to said fluid spring chambers through supply control valves, respectively;
   fluid exhaust means for exhausting the fluid from said fluid spring chambers through exhaust control valves, respectively;
   communicating means for enabling and disabling communication between right and left fluid spring chambers of the vehicle;
   velocity detecting means for detecting a velocity of the vehicle;
   steering angle detecting means for detecting a steering angle;
   communciation control means for producing a disabling control signal for disabling said communicating means when conditions are satisfied that the velocity detected by said velocity detecting means exceeds a preset velocity and the steering angle detected by said steering angle detecting means exceeds a preset steering angle and for producing an enabling control signal when said conditions are not satisfied; and
   roll control means for producing a control command signal for opening desired ones of said supply and exhaust control valves for a preset control time in order to supply a preset amount of fluid to contracted fluid spring chambers along a roll direction and for exhausting a preset amount of fluid from stretched fluid spring chambers when said conditions are satisfied,
   wherein the preset velocity as one of said conditions determined by said communication control means is set to have a first value when said communicating means is enabled and to have a second value larger than the first value when said communicating means is disabled.

2. A vehicle suspension apparatus according to claim 1, wherein said communication control means enables output of the enabling control signal when said communicating means is disabled, said velocity detecting means detects that the velocity does not indicate a decelerating state of the vehicle and the steering angle detected by said steering angle detecting means is less than the preset steering angle.

3. A vehicle suspension apparatus according to claim 1, wherein the preset steering angle as one of said conditions determined by said communication control means has a first value when said communicating means is enabled and has a second value larger than the first value when said communicating means is disabled.

4. A vehicle suspension apparatus according to claim 3, wherein said communication control means prohibits output of the enabling control signal when said communicating means is disabled and said steering angle detecting means detects that a steering direction is not a steering direction to a neutral position.

5. A vehicle suspension apparatus according to claim 3, wherein said communication control means enables output of the enabling control signal when said communicating means is disabled, said velocity detecting means detects that the velocity does not indicate a decelerating state of the vehicle and the steering angle detected by said steering angle detecting means is less than the preset steering angle.

6. A vehicle suspension apparatus according to claim 1, wherein said roll control means sets as the preset control time a control time corresponding to a magnitude of a centrifugal force acting on the vehicle, which is determined in accordance with the velocity detected by said velocity detecting means and the steering angle detected by said steering angle detecting means.

7. A vehicle suspension apparatus according to claim 6, wherein said roll control means further comprises:
    memory means for storing a control time of a previously output control command signal; and
    calculating means for calculating a difference between the control time stored in said memory means and a control time calculated in a time interval after the previous control signal is output and before the enabling control signal is output by said communication control means, and said roll control means produces an additional control command signal for opening for a calculated time said desired ones of said supply and exhaust control valves when the time calculated by said calculating means is a positive value.

8. A vehicle suspension apparatus according to claim 1, wherein said communication control means and said roll control means comprise a controller with a microcomputer.

9. A vehicle suspension apparatus comprising:
    air spring chambers arranged for respective wheels of a vehicle and interposed between the respective wheels and vehicle body members;
    air supply means for supplying air to said air spring chambers through supply control valves, respectively;
    air exhaust means for exhausting the air from said air spring chambers through exhaust control valves, respectively;
    communicating means for enabling and disabling communication between right and left air spring chambers of the vehicle;
    velocity detecting means for detecting a velocity of the vehicle;
    steering angle detecting means for detecting a steering angle;
    communication control means for producing a disabling control signal for disabling said communicating means when conditions are satisfied that the velocity detected by said velocity detecting means exceeds a preset velocity and the steering angle detected by said steering angle detecting means exceeds a preset steering angle and for producing an enabling control signal when said conditions are not satisfied; and
    roll control means for producing a control command signal for opening desired ones of said supply and exhaust control valves for a preset control time in order to supply a preset amount of air to contracted air spring chambers along a roll direction and for exhausting a preset amount of air from stretched air spring chambers when said conditions are satisfied, wherein the preset velocity as one of said conditions determined by said communication control means is set to have a first value when said communicating means is enabled and to have a second value larger than the first value when said communicating means is disabled.

10. A vehicle suspension apparatus according to claim 9, wherein said air supply means has a compressor and a first reserve tank for containing compressed air exhausted from said compressor.

11. A vehicle suspension apparatus according to claim 10, wherein said air supply means has a second reserve tank for containing air exhausted from said air spring chambers, and a suction side of said compressor is connected to said second reserve tank.

* * * * *